Patented Oct. 17, 1950

2,526,601

UNITED STATES PATENT OFFICE 2,526,601

PLASTICIZATION AND VULCANIZATION OF BUTADIENE-ACRYLIC NITRILE COPOLYMER

Loring Coes, Jr., Brookfield, Mass., assignor to Norton Company, Worcester, Mass., a corporation of Massachusetts No Drawing. Application July 30, 1947, Serial No. 764,927. In Canada October 17, 1946

8 Claims. (Cl. 260—30.4)

This invention relates to the plasticizing and vulcanization of that type of synthetic rubber known as "Perbunan" which, in its more usual form, comprises the copolymer of butadiene with acrylic nitrile; numerous difficulties have heretofore been encountered in working up and plasticizing this material, and to vulcanize it sulfur is universally employed. This application is a continuation in part of my copending application, Serial No. 635,434, filed December 15, 1945, now abandoned.

One of the objects of this invention is to facilitate the plasticizing and vulcanization of the Perbunan type of synthetic rubber, to improve the workability thereof as on mill rolls or in mixers, to facilitate the admixture therewith of other ingredients such as fillers, pigments, refractory grains, and the like, and to improve the vulcanization thereof. Another object is to provide vulcanizing agents that may be used instead of sulfur and thus avoid certain disadvantages attendant upon the use of sulfur. Another object is to provide vulcanizing agents that may be used in conjunction with or in the absence of sulfur. Another object is to provide vulcanizing agents, and a method of treating the Perbunan type of compound therewith, to produce at will a vulcanizate of any desired degree of hardness, within ranges from the Ebonite type of hardness to vulcanizates of extreme softness. Another object is to carry out the above-mentioned objects by ingredients and methods that will not impair or detrimentally affect known desirable properties of Perbunan vulcanizates, such as good resistance to heat and petroleum products, good dielectric properties, tensile strength, resistance to deterioration, and the like.

Another object is to provide a dependable and practical method of treatment of the Perbunan type of copolymer to prepare it for conversion, particularly where fillers and other additions are to be added, into useful forms or shapes, and to provide for its vulcanization in an efficient and commercially practicable manner. Another object is to provide vulcanizing agents for the Perbunan type of copolymer that can function in liquid form during working up of the copolymer with or without fillers or additions and thereby achieve a much sought-after plasticity of the copolymer or mix and facilitate and materially expand practical uses and applications of this compound. Another object is to provide vulcanizing agents for the Perbunan type of copolymer which can function also as plasticizing agents. Another object is to provide a Perbunan type of vulcanizate that will be free from such disadvantages as are inherent in sulfur-vulcanized Perbunan and that can be produced without the disadvantages imposed upon sulfur as a vulcanizing agent. Another object is, in general, to provide an improved and better process for producing Perbunan types of vulcanizates and to produce dependable vulcanizates within a wide range of characteristics well adapted to meet the widely varying requirements of practical use. Other objects will be in part obvious or in part pointed out hereinafter.

The invention, accordingly, consists in the features of construction, combinations of elements, arrangements of parts, and in the several steps and relation and order of each of said steps to one or more of the others thereof, all as will be illustratively described herein and the scope of the application of which will be indicated in the following claims.

The copolymer of butadiene and acrylic nitrile, vulcanizable with sulfur, is one of the so-called "Buna" synthetic rubbers and has become widely known as "Perbunan." Heretofore vulcanizates have been achieved by effecting vulcanization of the Perbunan copolymer by the use of sulfur, and it is recognized that this copolymer breaks down, as when worked on mill rolls, only with substantial difficulty and that various expedients have been resorted to in the endeavor to facilitate this breaking down or to achieve plasticizing during working on mill rolls or in mixers. This resistance of plasticizing, in turn, complicates working into the mix of fillers, pigments, and various other additives—most, if not all, of which are in dry or powdered or granular form—with the result that the mix, instead of plasticizing or becoming plastic or flowable, becomes crumbly and frequently breaks up or disintegrates into lumps. The addition of sulfur as a vulcanizing agent does not ameliorate these conditions or difficulties. It is such deficiencies in known practices of compounding mixes with the Perbunan type of copolymer that my invention aims to overcome, and the practice of my invention is best illustrated with respect to the acrylic nitrile copolymer of butadiene.

I have produced acetals that are the reaction product of an aldehyde and a polyhydric alcohol, and I have discovered that they are capable of functioning in at least a two-fold capacity, namely, (1) to act, apparently largely or solely by physical action, on the acrylic nitrile copolymer, to facilitate breaking it down on mill rolls or in a mixer, or, in other words, to plasticize it, and (2) to react with the copolymer, under heat treatment, to vulcanize it or, in other words, to serve as a vulcanizing agent. The typical or illustrative reaction to achieve vulcanization is set forth later herein, as is also a goodly number of illustrative acetals of the above-mentioned kind, all of which function for the purposes of my invention. These acetals are in both liquid and solid form when initially applied to the copolymer on mill rolls or in a mixer, having rapid and excellent plasticing action, and thus also greatly facilitate the matter of working into the copolymer of additions such as fillers of various kinds, including reinforcing fillers, active fillers, pigments, and other materials in the nature of fillers as are employed generally in the compounding or manufacture of products made of natural and synthetic rubbers. Since they also serve as vulcanizing agents, no addition in the nature of known vulcanizing agents such as sulfur need be made, and thus the otherwise added step of incorporating finely-divided sulfur can be eliminated and processing thus facilitated. The statement of this advantage, however, is not to be construed as excluding from the scope or purview of my invention the use in conjunction with the bi-functional (plasticizing and vulcanizing) agents in my invention of also any other differently reactive vulcanizing agents such as sulfur.

The plasticizing and vulcanizing agents of my invention have the characteristic, distinguishing them from sulfur which is the heretofore commercially employed vulcanizing agent for the Perbunan type of copolymer, of reacting under heat treatment or cure with the polymer at or with the nitrile group or groups; this action is one of polymerization or of linking or cross-linking at points or places in the copolymer with which sulfur as a vulcanizing agent does not react or link. Sulfur does not react with or at the nitrile groups, and its reaction takes place on double bonds of CH groups. It is thus possible according to certain features of my invention, by the use of the vulcanizing acetal agents of my invention and as hereinafter described, and also sulfur, to achieve during the heat cure a two-fold vulcanizing reaction with the sulfur reacting at the double bonds of CH groups and the acetals of my invention reacting at the nitrile or CN groups.

The following acetals which are the reaction product of an aldehyde and a polyhydric alcohol will function according to my invention:

1. 2 phenyl dioxolane-1,3
2. Penta erythritol diformal
3. 2 furfuryl (2) dioxolane-1,3
4. Trimethylol propane formal
5. 5 methyl, 5 hydroxymethyl dioxane-1,3
6. 4-phenyl-m-dioxane
7. 4,4,-diphenyl-m-dioxane
8. Penta erythritol difurfural The foregoing eight acetals may be prepared and are identified as follows:

1. 2 phenyl dioxolane-1,3

Three hundred and eighteen cc. of benzaldehyde, one hundred and eighty-eight cc. of glycol and fifteen grams of para toluene sulphonic acid were heated under reflux for 48 hours. The mixture was poured into water, washed and then dried over sodium sulphate and distilled. The fraction boiling at 120°–125° C. at 15 mm. pressure was collected. This was 2 phenyl dioxolane-1,3. It is colorless and has a faint odor resembling benzaldehyde. The structure is as follows:

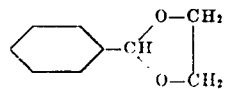

2. Penta erythritol diformal

Nine thousand five hundred and thirty grams of penta erythritol, three thousand six hundred grams of paraformaldehyde and 150 cc. of concentrated hydrochloric acid were heated on a steam bath for 36 hours. The mixture was then distilled under reduced pressure. The fraction boiling at 105°–112° C. at 5 mm. of pressure was collected as the diformal. The yield was nine hundred and ninety-eight grams. The diformal solidified on cooling to a white crystalline solid having a melting point 49°–50° C. The structure is as follows:

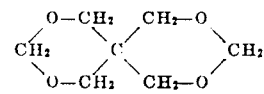

3. 2 furfuryl(2)dioxolane-1,3

Six hundred cc. of furfural, three hundred and sixty cc. of glycol, fifty grams of ammonium chloride and two hundred cc. of dioxane were distilled slowly (8 hours) through a two foot fractionating column until the temperature at the top reached 65° C. under 5 mm. of pressure. The undistilled portion was poured into water, washed and dried over sodium sulphate. This portion was then distilled at 5 mm. of pressure and the fraction boiling at 70°–75° C. was collected as 2 furfuryl(2)dioxolane-1,3. This is a pale yellow liquid with an odor resembling furfural. The structure is as follows:

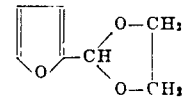

4. Trimethylol propane formal

Three hundred grams of trimethylol propane and sixty-seven and one-half grams of paraformaldehyde were heated on a steam bath with five hundred cc. of dioxane and forty grams of ferric chloride for sixteen hours. The mixture was then poured into water, washed, dried over sodium sulphate and distilled. The fraction boiling at 135°–140° C. at 18 mm. of pressure was collected as the formal. It is a colorless, odorless viscous liquid. The structure is as follows:

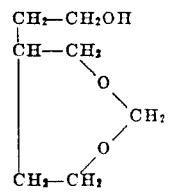

5. 5 methyl, 5 hydroxymethyl dioxane-1,3

Three hundred and sixty grams of penta glycerol, ninety grams of paraformaldehyde, fifty grams of ferric chloride and one thousand cc. dioxane were distilled slowly at 15 mm. of pressure. The fraction boiling at 120°–125° C. at 18 mm. of pressure was collected as the acetal. It is a colorless, odorless, somewhat viscous liquid. The structure is as follows:

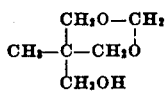

6. 4-phenyl-m-dioxane

Two hundred and eight grams of styrene, one hundred and twenty grams of paraformaldehyde, 25 cc. of sulphuric acid and 500 cc. of absolute ether were mixed and allowed to stand for twenty-four hours at room temperature. This mixture was then poured into water, washed free of acid and the ether layer was separated and dried over sodium sulphate. The residue was then distilled and the fraction boiling at 125°–128° C. at 18 mm. of pressure was collected as the dioxane. This is a colorless, odorless liquid. The structure is as follows:

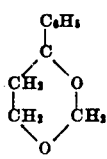

7. 4,4,-diphenyl-m-dioxane

Seventy-two and four tenths grams of unsymmetrical diphenyl ethylene, twenty-four grams of paraformaldehyde, ten grams of sulphuric acid and one hundred cc. of ethyl ether were allowed to stand at room temperature for twenty-four hours. The solution was poured into water, washed with sodium carbonate solution and dried over potassium carbonate. The residue was distilled and the fraction boiling at 155°–160° C. at 10 mm. of pressure was collected and recrystallized from carbon tetrachloride. This was the dioxane which was in the form of white crystals melting at 80° C. The structure is as follows:

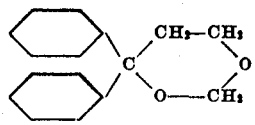

8. Penta erythritol difurfural

One hundred and thirty-six grams of penta erythritol and one hundred and ninety-two grams of freshly distilled furfural were heated at 100° C. for six hours with ten grams of ammonium chloride. The mix solidified on cooling. The resulting cake was ground, washed with water, dried and recrystallized from ethyl acetate. There resulted two hundred and forty-three grams of the penta erythritol difurfural in brown rhombic crystals melting at 158° C. The structure is as follows:

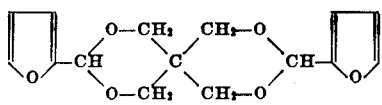

The acetals of my invention react, during vulcanization, by a two-fold reaction, as is later set forth. Preferably a catalyst is employed, as is later pointed out. The acetals listed can be mixed so that any two, any three, any four, any five, any six, any seven or all eight thereof can be used as plasticizer-vulcanizers in my invention.

Where any of the acetals is in a solid form, it is added to the mass of the Perbunan synthetic by first breaking it up into suitably small particles, for example, approximating pulverized condition, so as to facilitate initial incorporation thereof into the mass being worked in the mixer or on mill rolls whence the heat of the mix melts it and thus, in liquid form, it plasticizes the mass and is readily dissolved therein. Mechanical working is continued until the acetal, or acetals, whether added in liquid or solid form, or both, to the mix, is substantially dissolved by the latter and homogeneity or uniform plasticity throughout the mass is achieved.

The catalyst is preferably added at this stage, while the mix is still on the mill rolls or in a mixer, such as a Banbury mixer. The catalysts which are used are solid at room temperature and at temperatures substantially above room temperature they give an acid reaction, in some cases because they become acidic and in other cases because upon dissociation they yield acid such as hydrochloric acid. This is advantageous because a mix or uncured stock can be stored for an indefinite length of time and since the catalyst is solid and not acidic at room temperature, there is no reaction during the period of storage, the storage being, of course, at room temperature. Room temperature is well understood and can be defined as temperature under 100° F. (38° C.) and above 50° F. (10° C.).

For example, sulphamic acid, and toluene sulphonic acid are illustrative of a number of acids which are solid at ordinary room temperatures and which I can employ so that they do not become active until the cure of the mix is commenced.

Or, as catalysts, I may use substances which liberate acids at temperatures materially above room temperatures, such as the temperature of the subsequent cure of the mix. Polyvinylidene chloride is an illustration of such a substance, in that it does not liberate hydrochloric acid at room temperatures but effects its liberation at temperatures which are suitable for curing of the mix, such as in the neighborhood of 100° C. or 150° C. It happens also to be a solid at room temperature. Other illustrative substances of this character are salts of ammonia, such as ammonium chloride; also amines with inorganic acids, such as amine hydrochloride, including hydrochlorides of aromatics and aliphatics such as aniline hydrochloride, ethyl amine hydrochloride, methyl amine hydrochloride, etc.

It is advantageous and preferred to use substances or compounds such as the above-mentioned chlorides which liberate hydrogen chloride as a gas, during the curing stage, for the liberated gas well permeates the mix or molded mass, and thus better uniformity of distribution throughout the mass is achieved and the catalytic action is thus also uniform.

As above noted, when the substance that is to provide the catalytic action or the catalyst is in solid form, it is ground up or comminuted in any suitable way and mixed into the mass during working of the latter, as on mill rolls or in the mixer so as to uniformly distribute the material throughout the mass and prepare it for uniformly distributed catalytic action during the subsequent cure or heat treatment. As will now be clear, the ingredient or substance that is the catalyst, or is to provide or liberate the catalyst, is preferably added to the mix during the working up of the mix and may be added thereto in any suitable manner, conveniently in the same way as other ingredients such as fillers, etc., etc., are added, and preferably the addition is made after plasticization of the mix by the bi-functional plasticizing and vulcanizing acetals has been substantially completed. Fillers, if used, may be added at the same time that the acetal is added, particularly if the latter is in liquid form, in which case also the acetal and the filler may be added together as by making a paste-like mix of the liquid acetal and the filler and adding the two in the form of such a paste-like mix. If the acetal is in solid form, it is preferably comminuted and in such form added to the mix, as earlier above described, and the filler added as soon as the solid acetal becomes liquid and dissolved into the mix, or, in other words, as soon as the acetal has plasticized the mass suitably for taking up of the filler. Usually about ten minutes, mixing in a Banbury mixer, or a commensurate period of time working on mill rolls, is appropriate. Anti-oxidants, in case it is desirable to employ them, can be added to the mix in any suitable way or at any appropriate time during mixing or working, and they may be added, for example, when the acetal is added. Accelerators can be omitted, if desired and preferably are so omitted. in view of the action of the catalyst according to my invention.

An advantage of my invention is that the processing of the nitrile type of Buna copolymer, in the unvulcanized state, is greatly simplified and facilitated and is readily adaptable, accompanied by such simplification, to the use of apparatus or equipment heretofore employed in the processing of natural rubber in its unvulcanized state. For example, the step of plasticizing and the steps of adding other ingredients or materials may be carried on in a Banbury mixer, or on mill rolls, or such equipment may be used in succession. The step of plasticizing may be done in a Banbury mixer, for example, and some additives added to the mix, followed by working on mill rolls or followed by working in a kneader, and in such case, according to the character of ultimate product desired, other materials can be added to the mix while on the mill rolls or in the kneader.

The mass is then molded or shaped in any suitable way and subjected to heat treatment to effect reaction of the polyfunctional acetal with the butadiene copolymer at the nitrile group or groups of its molecules and, where the mix includes a potentially active catalyst material or carrier, to bring the catalyst into action in, for example, such ways as are earlier above described. Heat treatment is variable as to time and temperature and, for example, may be carried on at a temperature from about 100° C. to about 160° C., and the time of heat treatment may be from several hours to twenty hours or more, these factors being variable according to a number of factors above and later pointed out. Heat treatment according to my invention is in the range of heating to vulcanize rubber with sulphur, and may be referred to as vulcanizing temperature.

A wide range of temperatures and time periods of heat treatment is available, according to the selected acetal and various factors. For a given combination of the butadiene-acrylic nitrile copolymer and acetal (such as any one of the examples set forth in the illustrative table given above), the time period of the cure can be made longer if a less soft or harder vulcanized product is desired, and in such case also the temperature of the cure may be made higher or may be made to increase progressively with time. However, degree of hardness of the ultimate vulcanizate is a function of the ratio of plasticizing-vulcanizing acetal to the copolymer, more acetal giving greater hardness. Thus, for example, for a relatively soft vulcanizate or end product, from 20 to 30 parts of the acetal to 100 parts of the copolymer may be employed, and for a relatively hard vulcanizate the ratio may be increased to from 50 to 60 parts of one to 100 of the other; between these general limits, other ratios may, of course, be adopted according to intermediate degrees of hardness desired.

These generally stated ranges of upper and lower limits are necessarily somewhat wide because, in turn, some of the acetals are more reactive at the nitrile group or groups than others and thus achieve corresponding magnitudes of cross-linking, other conditions being the same. For example, of two acetals, the one that has the lower molecular weight gives more cross-linking, and thus a lesser quantity or proportion of it may be employed or the temperature of cure may be reduced or the time period of cure may be shortened. In general, however, I have found that the acetals of my invention are particularly suitable and desirable where hard vulcanizates are to be produced, although here again it will be understood that by varying other factors, such as by lessening the amount employed or appropriately varying the time or temperature of cure or both, soft vulcanizates can just as well be produced.

Another variable, controllable at will, is the catalyst. In general, it is employed in an amount ranging generally from about 1 to 10 parts per 100 parts of the copolymer. Some of the catalysts or catalytic agents or carriers are more effective or active than others, and the amount to be used can accordingly be varied for achieving any desired characteristic in the vulcanizate. In some instances the temperature of the cure may be varied according to the characteristic of the catalytic agent or its carrier, depending, for example, upon the temperature at which the carrier or convertible ingredient or substance liberates the acid which is the direct catalytic agent. Thus, for example, if such a substance liberated the acid catalyst at a temperature of, say, 130° C., one would, of course, not use a temperature of cure below that value. The amount of catalyst or potentially active catalytic agent to employ, of course, can be varied according to the degree of hardness desired in the vulcanizate. For example, for a given amount of acetal, present in sufficient quantity to give a certain extent of cross-linking with the butadiene-nitrile copolymer, the extent of such cross-linking for a given cycle of heat cure, as will now be clear, can be reduced by correspondingly reducing the amount of catalyst made available during cure or by using a catalytic or catalyst-carrying agent that is less active than others.

A wide flexibility of practical operating conditions is thus available and that has the advantage, among others, that the corresponding wide choice or selection makes it possible to suit, to the manufacture of a given vulcanizate, a procedure best adapted thereto from such viewpoints as efficiency and cost of production.

With the use of the above-identified acetals numbered 1 to 8 in the above table, I have made a substantial number of combinations thereof with the butadiene-nitrile copolymer, and I have produced a large number of satisfactory vulcanizates and among them vulcanizates of widely varying characteristics, particularly as to hardness, falling within the range which might be compared to a range from relatively soft rubber to hard rubber. It is not believed necessary to set forth, as examples, all of these many combinations of ingredients and their relative proportions and heat treatments, because they are exceedingly numerous and because I have fully and clearly described above the practice of my invention and the manner in which variables may be introduced or effected according to the results desired or according to such factors as desirable latitude or range of temperature and time of the heat treatment. The following few examples therefore, are to be interpreted as illustrative and not by way of limitation or restriction. In the following illustrations the proportions are given in parts by weight, in line with the proportions by weight earlier above indicated, and in each instance the cure was for two hours at 160° C. The butadiene copolymer with acrylic nitrile set forth in these illustrations is the commercial form known as "Hycar OR 15."

One hundred parts of the copolymer, 25 parts of 2 furfuryl (2) dioxolane-1,3, 200 parts of cryolite as a filler, and 4 parts of polyvinylidene chloride as the potentially active catalyst were mixed and molded, following the procedure earlier above described, and the resultant vulcanizate was strong, tough, and elastic.

One hundred parts of copolymer, 35 parts of penta erythritol diformal, 100 parts of "Furnex" carbon black, and 5 parts of polyvinylidene chloride gave a vulcanizate that was very stiff, tough, and strong.

Again using the same copolymer, the following are further illustrations in which, however, the cure was for thirty minutes at about 170° C.:

(x) 100 parts of the copolymer, 140 parts of clay known as "Suprex," 1 part of stearic acid and 5 parts of polyvinylidene chloride known as "Saran" as the catalyst, and 30 parts of 4-phenyl-m-dioxane were mixed and molded following the procedure earlier above described;

(y) 100 parts of the copolymer, 140 parts of clay "Suprex," 1 part of stearic acid and 5 parts of Saran as the catalyst, and 30 parts of penta erythritol diformal were mixed and molded following the procedure earlier above described; and (z) 100 parts of the copolymer, 140 parts of clay "Suprex," 1 part of stearic acid and 5 parts of polyvinylidene chloride (Saran) as the catalyst, and 30 parts of 2 furfuryl (2) dioxolane-1,3 were mixed and molded following the procedure earlier above described.

Three more examples were made, consisting of mixes and heat treatment according to the last three illustrations but omitting the catalyst. In all six illustrations good and satisfactory vulcanizates were achieved, those that were made with the use of a catalyst (designated $x$, $y$, and $z$) being harder and less resilient than those that were made without a catalyst (designated for convenience as $x°$, $y°$, and $z°$), the moduli of the latter group being numerically about one-third less than those employing a catalyst.

In these six illustrations, the moduli and tensile strengths, both in pounds per square inch, were in the order of these examples as just above set forth:

|  | With Catalyst | | | Without Catalyst | |
| --- | --- | --- | --- | --- | --- |
|  | Modulus | Tensile Strength |  | Modulus | Tensile Strength |
| Example ($x$) | 1,870 | 2,450 | Example ($x°$) | 1,100 | 2,540 |
| Example ($y$) | 1,420 | 2,680 | Example ($y°$) | 1,020 | 2,620 |
| Example ($z$) | 1,850 | 3,050 | Example ($z°$) | 1,360 | 2,850 |

All of the acetals of my invention have the characteristics above set forth of reacting at the nitrile group or groups of the butadiene copolymer and have structural characteristics that make possible such reaction and linking or polymerization with the copolymer at the nitrile group or groups thereof. These acetals may be written or represented thus:

(A) 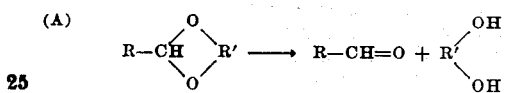

The butadiene copolymer having the nitrile group may be represented thus:

Under heat treatment the vulcanizing effect is achieved by a two-fold reaction which may be written or represented by the following two reactions:

(B) 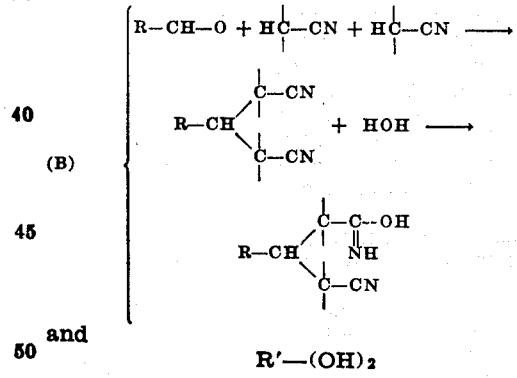

and $$R'—(OH)_2$$

with the copolymer the reaction is as follows:

(C) 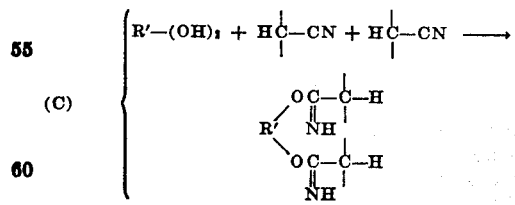

In the above formulae or reactions, R is a monovalent alkyl or aryl group containing not more than eight carbon atoms and R' is a divalent alkyl group, or aryl group, or hydroxy alkyl group, or hydroxy aryl group, or alkoxy alkyl group, or a furyl group, containing not more than eight carbon atoms. The acetals numbered 1 to 8 hereinbefore identified are represented by the above formula as defined and are the ones that I prefer.

As another set of many comparative illustrations or tests that I have produced, I note herewith two mixes that were made up and cured, one with a catalyst and one without, each comprising 85% of the above copolymer, 15% of penta erythritol diformal, and to the resultant mix there was added 80-grit size alumina grain in the proportion of 60% of the grain to the mix of copolymer and plasticizing acetal, and the resultant mix was cured at 160° C. for sixteen hours, in the one case employing no catalyst and in the other case employing a catalyst, in the manner above described, in an amount of 5% by weight of the copolymer and acetal mix. The resultant vulcanizate, where the catalyst was employed, had a modulus of rupture of 5800 lbs. per square inch; it was hard, strong, and tough. The resultant vulcanizate, without employment of a catalyst, was strong and resilient, and, being resilient, its modulus of rupture was not measurable.

Superior characteristics of the vulcanizate, for special purposes, can also be achieved, for example, as in the making of hard grinding wheels. As an illustration, 300 parts of Hycar OR15, 120 parts of penta erythritol diformal, 153 parts of a calcium silicate filler in finely-divided form, and 15 parts of polyvinylidene chloride as the potentially active catalyst were mixed, following the procedure above described, and then alumina abrasive grain of 46-grit size was worked into the plastic mass, also in the manner above described, using 78 parts of the abrasive grain to 22 parts of the bond. The resultant abrasive mix was molded and baked at 160° C. for twenty-four hours. The resultant grinding wheel, in this illustration 12" in diameter and $\frac{3}{32}$" in thickness, was a hard wheel and outperformed, in the grinding of one-inch steel tubes, a corresponding hard natural rubber-bonded wheel. On speed tests, that is, to withstand the effects of centrifugal force, it showed vastly superior strength and factor of safety, breaking at 25,000 surface feet per minute, whereas a speed test of from 8,500 surface feet per minute to 16,000 surface feet per minute is considered satisfactory for a certain range of organic bonded grinding wheels.

As earlier above noted, the reaction is two-fold: the acetal breaks down or decomposes, under the heat of cure, into an aldehyde component and an alcohol component which respectively react according to the reactions (B) and (C) set forth above. The respective reactions take place at the nitrile groups, and the effect of the polymerization and linking and cross-linking, due to the vulcanizing agents employed, is directly reflected in the specific properties such as strength, elasticity, toughness (hardness, where desired), etc., that the vulcanizate has and which the copolymer in unvulcanized state does not possess.

The acetals that are usable in my invention are acetal reaction products of liquid or gaseous aldehydes with polyhydric alcohols, whether or not the acetal reaction products are liquid or solid.

As earlier above noted, my invention does not exclude the use in conjunction with it, or as part of its process, of sulfur as a vulcanizing agent. The rapid and efficient plasticization achieved by the acetals of my invention greatly facilitates the addition to the mass of the copolymer of additives including, when desired, sulfur which can thus take part in the vulcanization, its reaction with the copolymer, in bonding or linking thereto, not conflicting with the reaction at totally different points of places at the nitrile group of the acetals of my invention. It is thus possible, by the use of both, to achieve a two-fold vulcanizing effect and a complex cross-linking not heretofore achieved. Included in the many vulcanizates that I have made as above noted, is also a goodly number in which sulfur has also been added and in which the heat treatment is carried on at a temperature and for a period of time to achieve the two-fold reaction and two-fold vulcanizing effect of the sulfur and of the vulcanizing agents of my invention.

Where such two-fold vulcanizing effect is made use of, I produce resilient or flexible vulcanizates as distinguished from hard or rigid vulcanizates, by using from 1.5 to 3 parts of sulfur per 100 parts of the copolymer and from 20 to 50 parts of the plasticizing and vulcanizing acetals of my invention per 100 parts of the copolymer, with or without a catalyst and with or without any suitable accelerator such as has heretofore been employed, or is employable, to speed up the vulcanization reaction by the sulfur; that is, either or both, or neither, may be used. Also, the time and temperature of cure may be varied, as will now be understood. With the more reactive vulcanizing acetals of my invention, when used also with sulfur, the temperature of the cure may be reduced to around 110° C., for example, and with less reactive vulcanizing acetals the temperature of the cure may be elevated, say, around 150° C., and in either case resilient or soft or flexible vulcanizates achieved.

Between the highly resilient vulcanizate and the hard vulcanizate above described, and either can contain fillers, pigments, or the like, as will also be clear, a wide range of intermediate vulcanizates can be produced, as will now also be clear in view of all of the foregoing.

It will thus be seen that there has been provided by this invention a method and product in which the various objects hereinbefore set forth, together with many thoroughly practical advantages, are successfully achieved. Aside from the advantages above specifically mentioned, it might be noted that the known characteristic of Perbunan or Buna N type of vulcanizates in being oil-resistant and many other desirable characteristics of such vulcanizates, all of which vulcanizates have heretofore been achieved only by vulcanization with sulfur, are not impaired in achieving plasticization and vulcanization according to my invention.

Another practical advantage achieved by my invention is that the weakening effects which softeners as heretofore employed have upon the vulcanizate or end product, are avoided in the vulcanizates of my invention. Softeners or the like employed according to known procedure remain, after cure, as physical entities distributed substantially uniformly throughout the vulcanizate and it is due to that fact that weakening results. For example, their presence as such can be shown by the fact that they can be extracted or dissolved, as by petroleum oils or the like. Such defects, however, are absent in the vulcanizates of my invention because such softeners need not be employed, and the agents which I employ to plasticize the copolymer in the unvulcanized state react with the copolymer and become part of the chemical and physical structure of the vulcanizate. Hence such weakening effects are absent and my vulcanizates achieve substantial permanency of characteristic in so far as avoiding the possibility of such changes taking place as follow when commonly used softeners are employed and dissolved out or extracted by petroleum oils or products including gasoline.

Moreover, it will be seen that my invention provides or permits wide flexibility of adaptation, both as to processing and curing treatments, and as to physical properties of the vulcanizates, to suit or meet a wide range of practical needs or requirements. Also, it will be seen that more convenient and more efficient production of vulcanizates by the use of the butadiene-nitrile copolymer is possible.

As various possible embodiments might be made of the mechanical features of the above invention and as the art herein described might be varied in various parts, all without departing from the scope of the invention, it is to be understood that all matter hereinbefore set forth is to be interpreted as illustrative and not in a limiting sense.

I claim:

1. The steps in a method of working and vulcanizing rubbery copolymers which comprises milling a mixture consisting of the copolymer of butadiene and acrylic nitrile and an acetal selected from the group consisting of 2 phenyl dioxolane—1,3; penta erythritol diformal; 2 furfuryl (2) dioxolane—1,3; trimethylol propane formal; 5 methyl, 5 hydroxymethyl dioxane—1-3; 4-phenyl-m-dioxane; 4,4,-diphenyl-m-dioxane and penta erythritol difurfural and mixtures thereof and reacting under heat treatment and in the presence of a catalyst selected from the group consisting of sulphamic acid, toluene sulphonic acid, polyvinylidene chloride, and amine hydrochlorides which is solid below 100° F. but which gives an acid reaction at vulcanizing temperatures above 100° F. the acetal with said copolymer at the nitrile groups of the latter to vulcanize the said copolymer.

2. A vulcanizable mix consisting of the copolymer of butadiene with acrylic nitrile, acetal selected from the group consisting of 2 phenyl dioxolane—1,3; penta erythritol diformal; 2 furfuryl (2) dioxolane—1,3; trimethylol propane formal; 5 methyl, 5 hydroxymethyl dioxane—1-3; 4-phenyl-m-dioxane; 4,4,-diphenyl-m-dioxane and penta erythritol difurfural and mixtures thereof and a catalyst selected from the group consisting of sulphamic acid, toluene sulphonic acid, polyvinylidene chloride, and amine hydrochlorides which is solid below 100° F. but which gives an acid reaction at above 100° F. at vulcanizing temperature of the mix to activate the acetal to react with the copolymer at the nitrile groups of the latter.

3. A vulcanizate consisting of the reaction product, under heat treatment, of butadiene acrylic nitrile copolymer, acetal selected from the group consisting of 2 phenyl dioxolane—1,3; penta erythritol diformal; 2 furfuryl (2) dioxolane—1,3; trimethylol propane formal; 5 methyl, 5 hydroxymethyl dioxane—1-3; 4-phenyl-m-dioxane; 4,4,-diphenyl-m-dioxane and penta erythritol difurfural and mixtures thereof and a catalyst selected from the group consisting of sulphamic acid, toluene sulphonic acid, polyvinylidene chloride, and amine hydrochlorides which is solid below 100° F. but which gives an acid reaction at vulcanizing temperatures above 100° F. to activate the acetal into reaction with the copolymer at the nitrile groups of the latter.

4. The steps in a method of working and vulcanizing a mixture consisting of the copolymer of butadiene and acrylic nitrile and acetal which comprise making a mix comprising the said copolymer, the acetal being selected from the group consisting of 2 phenyl dioxolane—1,3; penta erythritol diformal; 2 furfuryl (2) dioxolane—1,3; trimethylol propane formal; 5 methyl, 5 hydroxymethyl dioxane—1-3; 4-phenyl-m-dioxane; 4,4,-diphenyl-m-dioxane and penta erythritol difurfural and mixtures thereof, and a catalyst that is solid at room temperatures and actively acidic at vulcanizing temperatures, and heating the mix to vulcanizing temperatures to cause the catalyst selected from the group consisting of sulphamic acid, toluene sulphonic acid, polyvinylidene chloride, and amine hydrochlorides to become acidic and to activate the acetal to react at the nitrile groups of said copolymer to vulcanize the latter.

5. The steps in a method according to claim 1 wherein abrasive grains are included in the mixture.

6. A vulcanizable mix according to claim 2 including abrasive grains.

7. A vulcanizate according to claim 3 including abrasive grains.

8. The steps in a method according to claim 4 in which abrasive grains are included in the mixture.

LORING COES, Jr.

REFERENCES CITED

The following references are of record in the file of this patent:

UNITED STATES PATENTS

| Number | Name | Date |
| --- | --- | --- |
| 1,934,309 | Hoover | Nov. 7, 1933 |
| 2,028,403 | Mares | Jan. 21, 1936 |
| 2,334,526 | Allison | Nov. 16, 1943 |
| 2,340,907 | Sussman | Feb. 8, 1944 |
| 2,406,385 | Kistler | Aug. 27, 1946 |